United States Patent [19]

Curtis, Jr.

[11] Patent Number: 4,502,653
[45] Date of Patent: Mar. 5, 1985

[54] PIPE SUPPORTING DEVICE

[75] Inventor: Marvin R. Curtis, Jr., North Salt Lake, Utah

[73] Assignee: Miro Industries, Inc., Midvale, Utah

[21] Appl. No.: 452,037

[22] Filed: Dec. 22, 1982

[51] Int. Cl.³ .............................................. F16L 3/16
[52] U.S. Cl. .................................... 248/55; 248/68.1; 248/74.1
[58] Field of Search ............ 248/55, 65, 68 R, 68 CB, 248/73, 74 B, 74 A, 69, 66, 49, 74 PB; 198/824, 825; 308/6 R; 165/162, 82

[56] References Cited

U.S. PATENT DOCUMENTS

| D. 190,429 | 5/1961 | Hoagland | 248/68 R |
|---|---|---|---|
| 1,788,939 | 1/1931 | Axlund | 248/55 |
| 1,845,836 | 2/1932 | Hauser | 248/55 |
| 1,911,485 | 5/1933 | Axlund | 248/55 |
| 2,103,811 | 12/1937 | Davis | 306/6 R |
| 3,253,416 | 5/1966 | Madison | 198/824 |
| 3,508,730 | 4/1970 | Knezo | 248/74 A |
| 3,735,973 | 5/1973 | Petrie | 248/55 |
| 3,924,676 | 12/1975 | Bennett | 248/68 CB |
| 4,029,277 | 6/1977 | Bulanda | 248/74 R |
| 4,032,002 | 6/1977 | Jackson | 198/825 |
| 4,118,838 | 10/1978 | Schiefer et al. | 248/68 CB |

FOREIGN PATENT DOCUMENTS 2363687  5/1975  Fed. Rep. of Germany ... 248/74 PB

Primary Examiner—William H. Schultz
Assistant Examiner—Ramon O. Ramirez
Attorney, Agent, or Firm—Mallinckrodt, Mallinckrodt, Russell & Osburn

[57] ABSTRACT

A pipe-supporting device adapted to receive and support an exposed pipe on a roof has a substantially flat bottom for resting on the roof and an upwardly tapered structure secured on and rising from the base to provide a pipe positioning and supporting structure which substantially equally distributes the weight of the supported pipe over the area of the base in contact with the roof. The pipe positioning and supporting structure has a pocket for positioning a pipe therein and the pipe is supported in the pocket by at least one roller positioned in at least one receiving trough. As the pipe expands or contracts, it rides on the roller which rotates within the trough.

10 Claims, 9 Drawing Figures

PIPE SUPPORTING DEVICE

BACKGROUND OF THE INVENTION

1. Field

The invention is in the field of supports for exterior pipes on building roofs.

2. State of the Art

It is very common in commercial buildings for there to be various types of pipes which are exposed and run along the top of the roofs of such buildings. These pipes may be connected to air conditioning units mounted on a building roof or to various other service units.

It is currently common practice for these pipes to be supported above the roof surface at intervals along their length by placing blocks of wood between the roof surface and the pipes. With temperature changes, the pipes expand and contract and, partly because of the large contact surface area between a block and the pipe, the block moves with the pipe. After a period of time, the movement of the block against the roof with the weight of the pipe thereon causes damage to the roof, which usually results in a leak and requires expensive roof repair. Even where the blocks are nailed down to the roof, the nails and the wood usually deteriorate in a relatively short time period so that the blocks break loose. Further, wood blocks are difficult to seal so the roof usually leaks about these nail holes.

There is currently available a pipe holder which is mounted on a roof and has a shaft mounted pulley or roller on which the pipe rests and rolls as it expands and contracts. While this prevents problems due to contraction and expansion of the pipes, it is necessary that holes be made in the roof for mounting purposes, and the device is expensive. Where many holders are required, they can easily cost more than a number of later roof repairs. Thus, that roller solution to the problem has not achieved a great deal of commercial success.

There has recently been developed an improved pipe-supporting device which has a substantially flat bottomed base with pipe supporting structure rising from the base that substantially equally distributes the weight of the pipe over the bottom of the base and thus over the area of the roof in contact with the base. The pipe supporting structure has a substantially V recess having divergent line contacts for receiving and supporting the pipe above the base. In this manner, the pipe is supported in the V with two contact points. This provides for easy sliding movement of the pipe within the support as the pipe expands or contracts. This pipe supporting device is disclosed in application for U.S. Letters Patent Ser. No. 438,735, filed Nov. 3, 1982, and assigned to the same entity as is this application.

While the pipe-supporting device of the application just referred to is a significant improvement over the prior art, it has been found that the resistance to pipe movement with respect to the supporting device may be further lessened and the device thereby significantly improved by the use of inexpensive plastic rollers which fit into and rotate in receiving troughs.

SUMMARY OF THE INVENTION

According to the invention, a pipe-supporting device adapted to receive and support an exposed pipe on a roof has a base with a substantially flat bottom for resting on the roof, an upwardly tapered structure secured on and rising from the base to provide a pipe positioning and supporting structure having a pocket therein for positioning a pipe. Trough means is located within the pocket for receiving roller means upon which the pipe being supported rests. The roller means is adapted to roll in the trough as the pipe being supported expands or contracts, thus presenting very little resistance to movement of the pipe with respect to the supporting device. The pipe positioning and supporting structure has lower ends forming a symmetrical periphery at the base which substantially evenly distributes the pipe load over the base and on the roof.

In one preferred embodiment of the invention, the pocket is downwardly convergent with two arcuate sides which come together at the bottom of the pocket and with a top opening larger than the largest pipe to be supported. A trough extends across the bottom of the pocket with a roller positioned therein so that the top of the roller extends across the bottom portion of the pocket. In this way, a pipe positioned in the pocket rests on the roller, generally without touching the sides of the pocket. The pocket is provided to ensure that even in the event of lateral movement of the pipe or the holder, the pipe remains positioned in the pocket and on the roller.

In a second preferred embodiment of the invention, the pocket is also downwardly convergent and forms sustantially a V recess having divergent line contacts for receiving and supporting the pipe. In this embodiment, troughs are provided along the line contacts of the V with rollers therein so that the rollers actually form the line contacts. Thus, when a pipe is received in the V recess, it contacts and rests on the rollers forming the sides of the V.

In order to obtain an advantage from the rollers, the troughs and rollers must be made of materials which slide very easily with respect to one another. This requirement is met where, for example, the troughs are made of a polyvinylchloride plastic material and the rollers are made of a Nylon or Teflon plastic material. In such instances, the roller will roll within the troughs very easily and with much less resistance than a pipe sliding directly on a stationary surface as is the case with the device of application Ser. No. 438,735.

DRAWINGS

In the accompanying drawings, which illustrate the best mode currently contemplated for carrying out the invention:

FIG. 1 is a perspective view of a fragmentary portion of the flat roof of a building on which an exposed pipe is supported by several devices of the invention placed in position between the pipe and the roof;

FIG. 2, a perspective view of one of the pipe supporting devices shown in FIG. 1 drawn to a considerably larger scale;

FIG. 3, a top plan view of the pipe-supporting device of FIG. 2;

FIG. 4, a vertical section taken on the line 4—4 of FIG. 3;

FIG. 5, a bottom plan view of the device of FIG. 2;

FIG. 6, a vertical section taken on the line 6—6 of FIG. 3;

FIG. 7, a side elevation of a device of the invention drawn to a smaller scale and showing how a pipe-holding collar may be installed;

FIG. 8, a perspective view of a second embodiment of the invention; and

FIG. 9, a vertical section taken on the line 9—9 of FIG. 8.

DETAILED DESCRIPTION OF THE ILLUSTRATED EMBODIMENT

Figure 1:
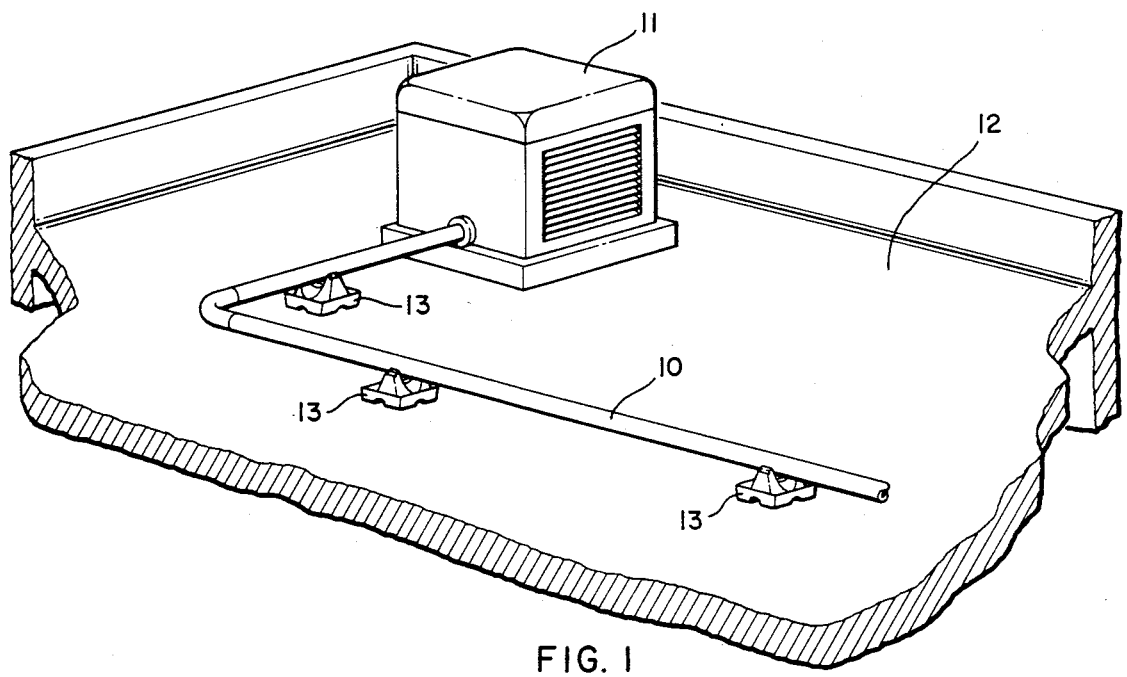

It is very common in commercial buildings to have a number of exposed pipes supported above the roof of the building. FIG. 1 shows a common installation in which a pipe 10 extends from an air conditioning unit 11, mounted on roof 12, across the roof to a location (not shown) where it extends over the side of the roof, through the roof, or is connected to other roof-mounted equipment. Pipe supporting devices 13 of the invention are positioned on roof 12 to support pipe 10 as it extends along the roof. The number of supporting devices needed depends upon the type of pipe supported, its size, weight, and the material from which it is made, as well as its configuration on the roof.

Figure 2:
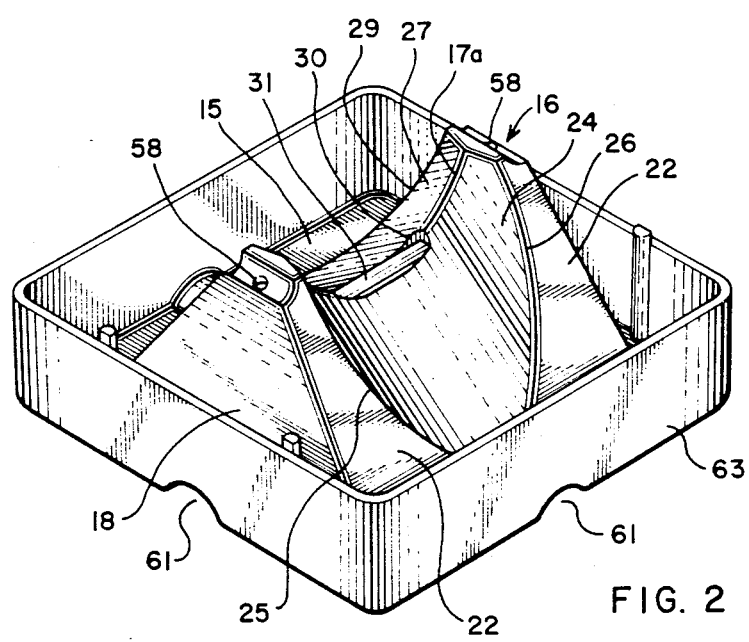
Figure 3:
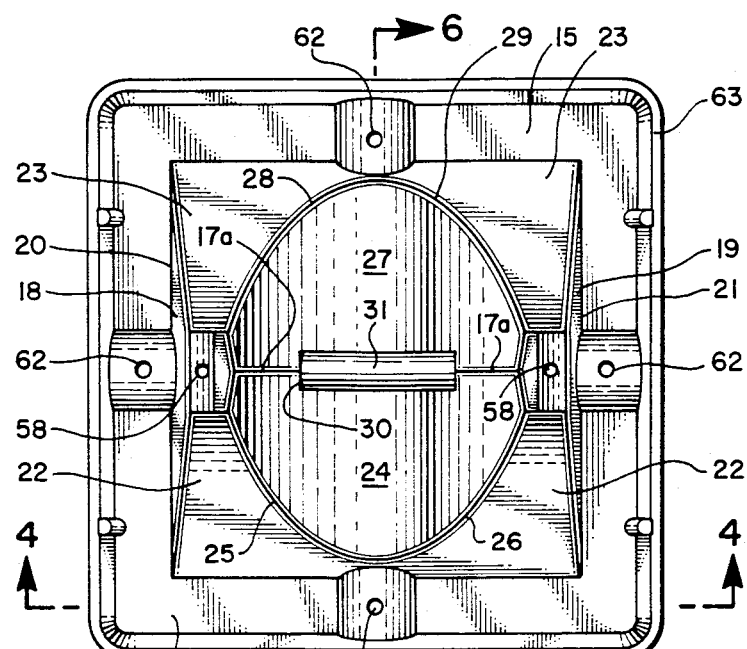
Figure 4:
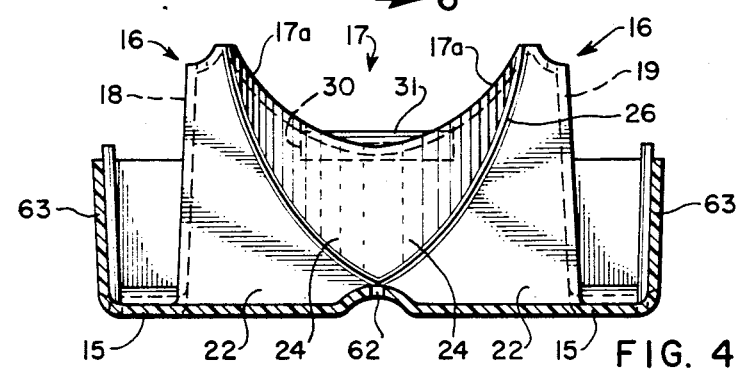
Figure 5:
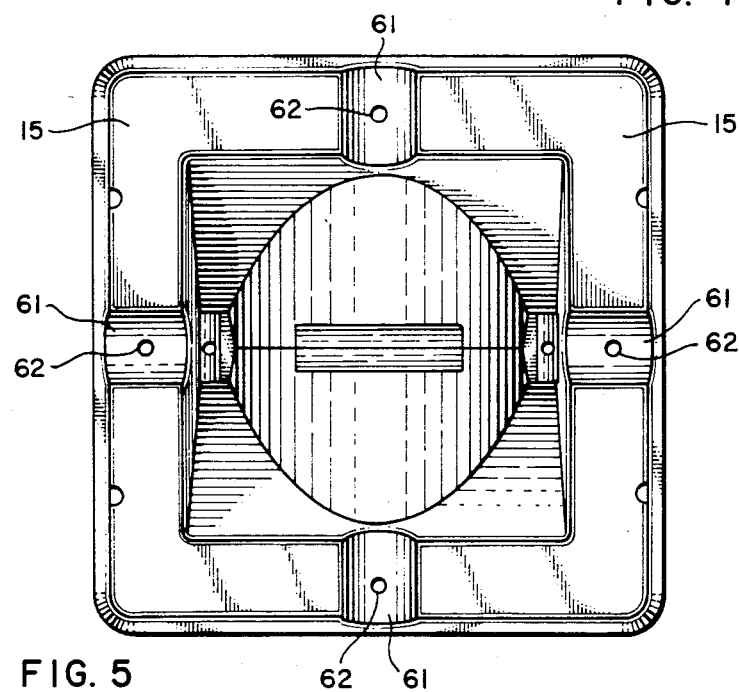

As shown, in the presently preferred embodiment of the invention, each pipe-supporting device 13 includes a substantially square base 15 from which an upwardly tapered pipe positioning and supporting structure, shown generally as 16, FIGS. 2 and 4, extends.

In the embodiment shown in FIGS. 2-7, the pipe positioning and supporting structure 16 is substantially square where it joins base 15 and provides a downwardly converging pocket 17, FIG. 4, for receiving a pipe to be supported. The structure is formed by substantially triangular walls 18 and 19 which extend upwardly from connection with base 15 along their bases 20 and 21, respectively, and by walls 22 and 23 which extend from base 15 upwardly along walls 18 and 19 to form upwardly tapered towers at opposite sides of pocket 17. Pocket 17 is defined by the line contact 17a formed by the intersection of wall 24, which extends from edges 25 and 26 of wall 22, with wall 27, which extends from edges 28 and 29 of wall 23. As shown, each side of pocket 17 is substantially arcuate.

Figure 6:
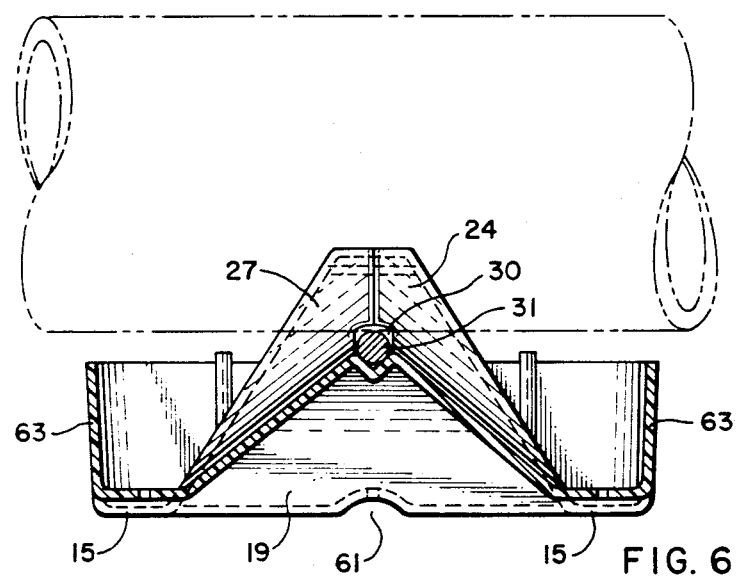

A trough 30 is formed in the bottom of pocket 17 to receive a roller 31 therein which extends across the bottom of the pocket. The trough is configured to provide a surface against which roller 31 can rotate and may be V shaped as shown in FIG. 6, or of various other configurations. The important consideration is that the configuration of the trough and the materials from which the trough and roller are made be such that the resistance to rotation of the roller in the trough is generally less than the sliding resistance of a pipe against the roller. It has been found that this occurs when the trough is molded integrally with the rest of the supporting device of a polyvinylchloride (PVC) plastic material and the roller is made of a Teflon or Nylon plastic material. Of course, various other materials could be used to produce the same desired results.

The structure described forms a pipe-supporting structure which provides for substantially even distribution of the pipe weight over the base 15 of the device. The substantially flat bottom of base 15 extends outwardly from the securement of the supporting structure to form a substantially flat peripheral area which contacts the roof surface. The flat area of base 15 does not extend under the supporting structure 16 when the device is of one-piece molded construction. Therefore, the area of contact with the roof surface is only the peripheral flat area. This area is designed to provide sufficient area to spread the weight of the pipe supported by the device over the roof so that the weight per unit area against the roof is of a value less than the breaking point or tensil strength of the roof surface. Also, the edges of the base 15 are rounded, as are the corners, and may be turned up so that the edges will not gouge the roof surface if the device slides along the roof.

Figure 7:
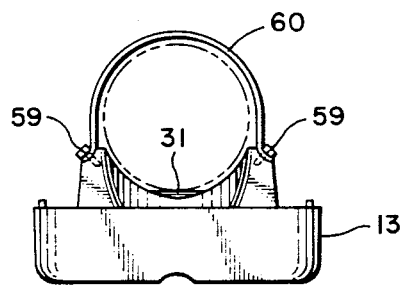

Pocket 17 has a top opening large enough to receive the largest pipe to be supported by the device. Thus, as shown in FIG. 7, in normal position, a pipe being supported will fit into the pocket and rest on roller 31 without touching the edges of pocket 17. Pocket 17 is necessary, however, to ensure that the supporting device remains in position with respect to the pipe upon lateral movement of the pipe or upon lateral movement of the supporting device. Thus, if the pipe being supported moves laterally, it will contact the pocket edge and move the supporting device along the roof with it. If the supporting device is secured to the roof, the edge of the pocket will hold the pipe against substantial lateral movement. For this reason, it is preferred that the edge of the pocket be formed, as illustrated, as a line contact rather than as a larger flat surface. The line contact reduces the resistance to movement of the pipe if the pipe is resting against the edge of the pocket as well as against the roller.

For certain types of pipes in certain states, it is required that the pipe be held in place by a collar. This is required, for example, by the building code in California for pipes which carry natural gas. For this purpose, the tops of the respective towers do not come to a point, but, rather, are configured as shown to provide for easy attachment of a collar. Indentations 58 are provided near the top of the towers to receive screws 59, FIG. 7, which hold in place collar 60. The collar may be of various shapes and made of various materials. Preferably, the collar is made of molded plastic material similar to that of the device itself, but in many instances, it will merely be bent from metal straping commonly referred to as plumber's tape. Also, as shown in FIG. 7, it is preferable that the collar does not clamp tightly about the pipe to be held, but merely closes the top of the pocket so that the pipe cannot escape therefrom. This arrangement leaves the pipe free to move on the roller. Indentations 58 rather than actual holes are preferred because screws can easily be driven through the plastic at the bottom of the indentations, if needed, and as in most cases, if screws are not needed, the holes are sealed so that moisture cannot pass through the holes and build up beneath the device.

It is preferred that the bottoms of the base 15 be formed so that channels 61 are provided therein. These allow any water that may run under the base, to run out and prevent accumulation of water under the base. At least one channel should be provided, but preferably, and as shown, a channel is provided on each of the four sides of the base. Holes 62 provide drainage into the channels 61 of any water or other material which is caught by the device when circumferential walls 63 are provided.

One embodiment of pipe-supporting device built, as shown, has a seven and one-half inch square base. The overall height of the device is about three and one-half inches and the pipe positioning and supporting pocket is about one and one-half inches deep. The top opening of the pocket is four inches so that the device can be used to support pipes up to four inches in diameter.

The top opening of the pocket, along with the size of the device, may vary so that it can be adapted to hold various ranges of different size pipe.

The provision of the pocket with substantially line contacts 17a defining the pocket allows the device to be used on sloping roofs or with sloping pipe and still have the pipe supported by the roller with substantially equal weight distribution of the pipe over the flat base area of the device.

It is presently preferred that the device be molded of a polyvinylchloride plastic material (PVC) having special additives to make it resistant to ultraviolet light. This material is preferred because it resists deterioration from exposure to ultraviolet light, i.e. sunlight, it meets the requirements for a Class A fire retardant, and is very strong. A PVC device with three thirty-seconds inch wall thickness and of the size described above has been found satisfactory to support pipes up to 80 pounds. Of course, other material may be used and may require different thicknesses for similar loads. The preferred material for the roller is Teflon.

When the rollers are made of a high temperature plastic material such as Teflon, an additional advantage is that high temperature pipes can be supported. Teflon can withstand temperatures up to about 550° F. without melting or deforming. This temperature is much higher than the melting point of PVC. Teflon also has good heat insulating characteristics. Thus, much higher temperature pipe can be supported by the Teflon supporting surface than could be supported by a PVC supporting surface. However, PVC is much less expensive than Teflon so from an economic standpoint, it is preferred to make as much of the device as possible of PVC.

It has been found that the edges of the base should be at least about one-eighth inch high in order to avoid gouging the roof. Thus, if the base of the material is less than one-eighth inch thick, and large circumferential walls 63 are not provided, the edges of the base should be turned up to provide walls of at least the one-eighth inch.

Figure 8:
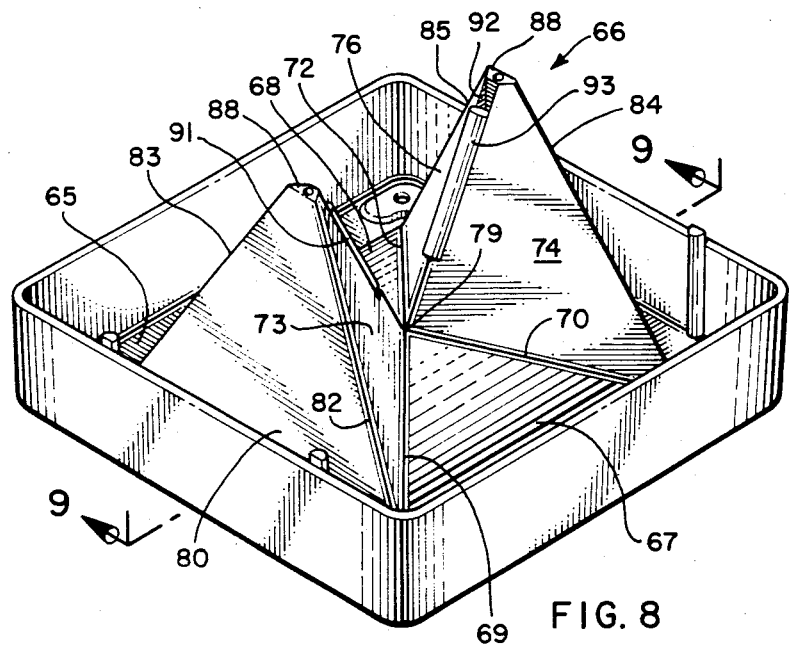
Figure 9:
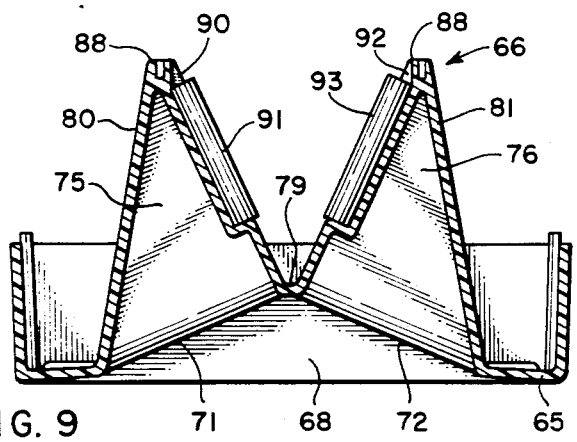

A second embodiment of the invention is shown in FIGS. 8 and 9. The device of this embodiment is constructed similarly to the device described in application Ser. No. 438,735, but with the addition of troughs and rollers. Thus, the pipe-supporting device shown in FIGS. 8 and 9, includes a substantially square base 65 from which an upwardly tapered pipe positioning and supporting structure, shown generally as 66, extends.

The pipe-supporting structure 66 is constructed to provide a downwardly converging, substantially V-shaped pocket for receiving, intermediate its depth, the pipe to be supported and for providing substantially uniform distribution of the weight of the pipe over the area of the base 65 that is in contact with the roof. The vertex of the V is located above the level of the base, and walls 67 and 68 slope upwardly from the base 65 to meet with the lower ends 69, 70, 71, and 72 of sets of walls 73, 74, 75, and 76 which intersect to form the V, to form upwardly tapered towers. The walls 67 and 68 in this illustrated embodiment of the invention are substantially triangular in shape, with their bases secured to the base 65 of the device and their apices coming together at the vertex of the pipe-supporting V as indicated at 79. Walls 80 and 81 extend upwardly from base 65 and meet with walls 73 and 75, and 74 and 76, respectively, along edges 82, 83, 84 and 85, respectively. Their bases also join base 65. With this arrangement, the tapered towers take the form of a portion of a pyramid. The towers may extend to a point, or, as shown, may be cut off and have small flat areas 88 at their tops. While walls 80 and 81 are shown as sloping, and some slope is preferred for ease of releasing the device from the mold when molded, such slope is not required and these walls could be vertical.

Trough 90 is provided along a portion of the intersection of walls 73 and 75 and is adapted to receive roller 91. Trough 92 is provided along a portion of the intersection of walls 74 and 76 and is adapted to receive roller 93. Thus, rollers 91 and 93 provide line contacts defining the V-shaped pocket. A pipe supported by this device will be held in the V by two point contact, i.e. one point of contact on each roller. Movement of the pipe within the V will cause rotation of the rollers, which presents less resistance to movement of the pipe than do the stationary surfaces of the support of application Ser. No. 438,735, and thus, the support has less tendency to slide along the surface of the roof.

Of course, with this embodiment, the angle of the V, along with the size of the device, may vary so that it can be adapted to hold various ranges of different size pipe.

While particular geometric structures have been described and illustrated, it should be understood that any structure providing substantially equal weight distribution over the base of the device could be used. Also, while the pockets have been shown as downwardly convergent, rectangular pockets could be used. In such instance, as well as with some other geometries, rollers could be provided in the bottom of the pocket and along the sides of the pocket as well.

With the use of a trough in which a roller can be received, there is no need for a pipe-supporting pulley or roller to be mounted on a shaft for rotation and consequently, much of the expense of the prior art support which utilized shaftmounted rollers is eliminated. Further, use of the rollers with a structure that substantially evenly distributes the weight of the supported pipe over the relatively large area of contact between the base of the support and the roof provides a device which is relatively inexpensive, easy to install, and which does not damage a roof upon which it is used.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A pipe-supporting device adapted to receive and support an exposed pipe on a roof, said device comprising a base having a substantially flat bottom for resting on the roof; upwardly tapered structure secured on and rising from said base to provide a pipe positioning and supporting structure having a pocket for positioning a pipe therein; trough means within the pocket for receiving roller means therein; roller means adapted to fit into the trough means and to rotate therein and adapted to have a pipe rest thereon to be supported above the base, said pipe positioning and supporting structure having lower ends forming a symmetrical periphery at the base which substantially evenly distributes the pipe load on the roller means over the base and on the roof.

2. A pipe-supporting device according to claim 1, wherein the pipe receiving pocket is downwardly convergent.

3. A pipe-supporting device according to claim 2, wherein the roller means extends across the bottom of the downwardly convergent pocket forming a flat bottom therefore, and the roller means is adapted to receive and support a pipe to be supported by one point contact thereon.

4. A pipe-supporting device according to claim 3, wherein the downwardly convergent pocket is formed by two arcuate sides which meet at the bottom of the pocket.

5. A pipe-supporting device according to claim 4, wherein the device, except for the roller means, is integrally molded from a polyvinylchloride plastic material and the roller means is made of a Teflon plastic material.

6. A pipe-supporting device according to claim 4, wherein the trough means is a V-shaped grove.

7. A pipe-supporting device according to claim 2, wherein the downwardly convergent pocket forms a substantially V recess having divergent line contacts for receiving and supporting the pipe, and wherein the roller means includes a roller along each of the divergent line contacts so that the pipe is supported along such divergent line contacts by the rollers.

8. A pipe-supporting device according to claim 7, wherein the trough means are semicircular grooves.

9. A pipe-supporting device according to claim 7, wherein the device, except for the roller means, is integrally molded from a polyvinylchloride plastic material and the roller means is made of a Teflon plastic material.

10. A pipe-supporting device according to claim 1, wherein the base includes at least one channel formed in the bottom of the base to provide for drainage of water from under the device.

* * * * *